United States Patent [19]

Munnerlyn

[11] 3,740,150

[45] June 19, 1973

[54] SURFACE MEASUREMENT BY INTERFEROMETER

[75] Inventor: Charles R. Munnerlyn, Fairport, N.Y.

[73] Assignee: Tropel, Inc., Fairport, N.Y.

[22] Filed: Jan. 6, 1971

[21] Appl. No.: 104,404

[52] U.S. Cl. .............................. 356/109, 356/124
[51] Int. Cl. .............................................. G01b 9/02
[58] Field of Search .................... 356/106–113, 127

[56] References Cited
UNITED STATES PATENTS
3,512,891   5/1970   Baldwin ............................ 356/109

OTHER PUBLICATIONS
"A Laser Unequal Path Interferometer for the Optical Shop"; 6 Applied Optics 1237

Primary Examiner—Ronald L. Wibert
Assistant Examiner—Conrad Clark
Attorney—Cumpston, Shaw & Stephens

[57] ABSTRACT

An interferometer measures a test surface arranged in the test arm of the interferometer by using a focusing lens system movable along the test arm. The focusing lens system is adjustable along a slide that is movable along the test arm of the instrument, and the test surface is mounted at a region of maximum coherence function of the test beam. The focusing lens system is adjusted along the slide to focus the test beam on the surface of the test surface. Then by means of gauge blocks removably interposable between the slide and a reference surface and equalling the desired radius of curvature of the test surface, the slide is moved to bring the focus of the test beam to the region of the center of curvature of the test surface to observe interference fringes between light returning from the test surface and a plane wave front reference beam.

19 Claims, 5 Drawing Figures

Patented June 19, 1973
3,740,150
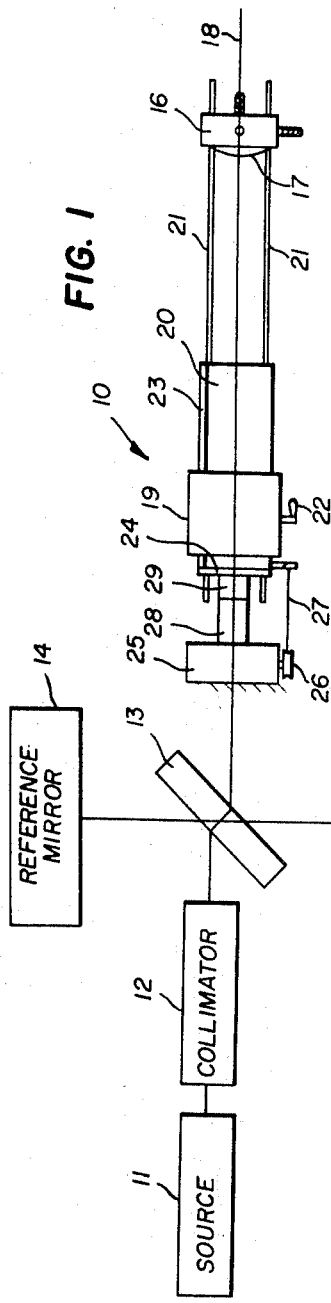
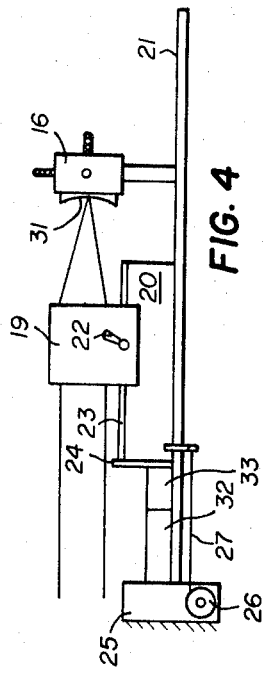
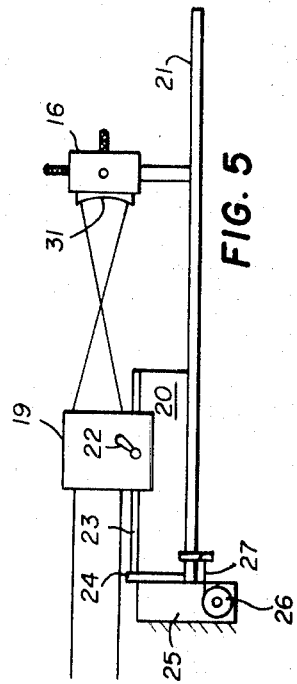
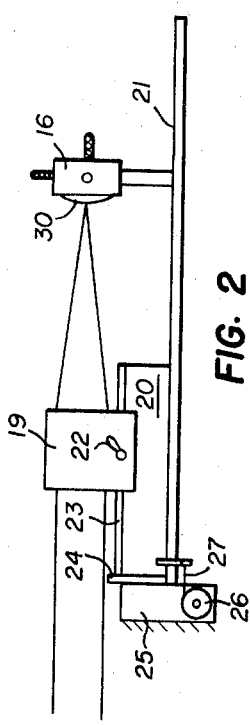
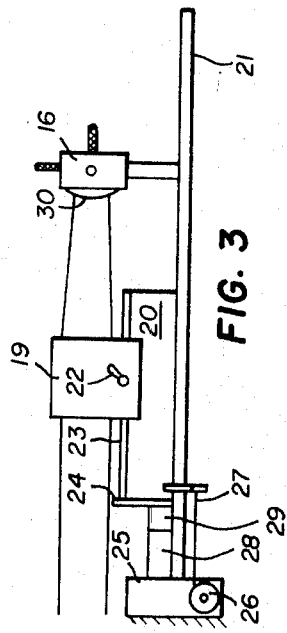
INVENTOR.
CHARLES R. MUNNERLYN
BY Cumpston, Shaw and Stephens
ATTORNEYS

SURFACE MEASUREMENT BY INTERFEROMETER

THE INVENTION IMPROVEMENT

Both optical and mechanical methods have been used in the optics industry for measuring or testing optical surfaces for evenness and accurate radius of curvature. Test glasses have been the standard testing device in lens manufacture, but these require an expensive inventory and suffer many inherent disadvantages. Optical methods have also been suggested and are discussed in a U.S. Department of Commerce National Bureau of Standards Report dated June 19, 1067, and entitled, "LABORATORY MANUAL ON PRECISE OPTICAL MEASUREMENTS." Generally, such optical measurements include movement between null positions, and reading the moved distance on a scale.

The invention involves recognition of the many disadvantages of test glasses including their inability to show surface evenness unless the radius is accurate to within a few fringes. The invention also considers the disadvantages and inaccuracies of optical methods that are necessarily time-consuming, involve inherent inaccuracies, and require reading of scales. Furthermore, the invention involves a realization that if an expedient measuring tool were available, radius tolerances could often be relaxed so long as surface regularity met required standards. For example, 5, 10 or more fringes of radius error can be focussed out in many lenses so long as surfaces are even, and separate measurement of surfaces and radii can eliminate much unnecessary grinding and polishing. The invention also includes an appreciation that much lens testing occurs after the labor and expense of centering, coating, cleaning, and assembling the components of the lens system, and that resulting losses could be avoided if an efficient method was readily available for testing the radii and evenness of the surfaces of each component before assembly.

The inventive concept offers a way of overcoming these disadvantages of prior art test glasses and optical surface measurement and suggests a better method that is accurate, convenient, fast, and versatile. The invention aims at economy in equipment, inventory, labor and time, and allows simpler and more economical lens design because of its more versatile testing capacity and its ability to measure evenness and radius separately.

SUMMARY OF THE INVENTION

The invention includes an interferometer and a method of operating it. The test arm of the interferometer includes a mount supporting the test surface, and a movable slide that carries a focusing lens system that is adjustable along the slide. Means are included for positioning the slide accurately a predetermined distance from a position wherein the lens system is spaced from the test surface by the focal distance of the lens system. The method includes adjusting the distance between the test surface and the focusing lens system to focus test beam light at a point on the test surface, and then moving the focusing lens system a distance equal to the desired radius of curvature of the test surface to move the light focus to the region of the center of curvature of the test surface. Then interference fringes can be observed between light returning from the test surface and a plain wave front reference beam to determine the deviation of the test surface from its desired radius. Then the test surface can be adjusted to reduce the fringes to a minimum to observe the evenness of the test surface

DRAWINGS

FIG. 1 is a schematic plan view of the inventive interferometer; and

FIGS. 2 — 5 are schematic elevational views of operating steps with the interferometer of FIG. 1.

DETAILED DESCRIPTION

Interferometer 10 is a Twyman-Green type interferometer with the inventive modifications made in the test arm of the instrument. Otherwise, the coherent light source 11, collimator 12, beam splitter 13, reference mirror 14, and observation point 15 are well known. These components of interferometer 10 can enjoy many off the variations already available in the art.

In the test arm of interferometer 10, an XYZ mount 16 supports a test surface 17 in test beam 18 which passes through a focusing lens system 19. Focusing lens 19 is adjustable along a precision slide 20 which moves along guide track 21 or other convenient guide along the test arm of interferometer 10. A clamp 22 or other holding device is preferably arranged for securing the position of focusing lens 19 along slide 20 such as by gripping guide rail 23 which guides focusing lens system 19 along slide 20. Many slides, clamps, guides, etc. are available or generally known for slide 20 and focusing lens 19.

Slide 20 is biased toward a fixed reference surface 25 by a winding device 26 mounted on surface 25 and tensioning a line 27 connected to slide 20. Combinations of gauge blocks represented by gauge blocks 28 and 29 are removably interposable between plate 24 on slide 20 and reference surface 25 for positioning slide 20 in using instrument 10.

FIGS. 2 and 3 show the use of interferometer 10 for measuring the surface 30 of a convex lens intended to have a specific radius of curvature. As shown in FIG. 2, slide 20 is positioned against reference surface 25, and focusing lens system 19 is moved along slide 20 until test beam 18 is brought to a coarse focus at a point on surface 30 as illustrated in FIG. 2. Then focusing lens 19 is clamped in place on slide 20 by clamp 22. For focus adjustment, XYZ mount 16 is arranged to hold surface 30 at a slight wedge angle relative to reference mirror 14 to produce linear fringes that are observed while mount 16 is moved in the direction of the test arm to bring test beam 18 accurately to a sharp focus at a point on surface 30.

One or more gauge blocks 28 and 29 are then selected to equal the desired radius of curvature of surface 30, and slide 20 is moved so that gauge blocks 28 and 29 can be inserted between plate 24 of slide 20 and reference surface 25 as shown in FIG. 3. This moves focusing lens system 19 toward surface 30 by an amount equal to the desired radius of curvature of surface 30 to move the focus of test beam 18 to the region of the center of curvature of surface 30. In this position test beam 18 is reflected from surface 30 as a return beam interfering with the reference beam of interferometer 10 so that the deviation of surface 30 from its desired radius of curvature can be observed directly by counting the round interference fringes that occur. This measurement can be made independently of surface evenness, and since radius tolerance is generally specified in fringes, the fringes can be counted directly, without reading scales, to determine quickly and easily whether surface 30 falls within the desired tolerance. For some lens surfaces, the curvature deviation could be as high as 10 or more fringes.

The surface regularity of lens 30 is then measured by adjusting mount 16 in the direction of test beam 18 to minimize the interference fringes and observe the evenness of the remaining fringes. Surface regularity measurement is thus independent of radius measurement. Small deviations in surface regularity cannot be directly observed when large numbers of fringes occur, but once the radius of curvature of surface 30 falls within the required tolerance, no matter how many fringes are permissible, mount 16 can then be adjusted to reduce these fringes and observe surface regularity directly without any scale reading or further work on the accuracy of the radius.

FIGS. 4 and 5 show the operations with interferometer 10 for testing concave surface 31. One or more gauge blocks 32 and 33 are selected to equal the desired radius of curvature of surface 31, and gauge blocks 32 and 33 are positioned as illustrated in FIG. 4 between reference surface 25 and plate 24 on slide 20. Then focusing lens system 19 is moved along slide 20 until test beam 18 is brought to a coarse focus on surface 31 and lens system 19 is clamped in place. Fine focus is made by adjusting mount 16 as described above to observe linear fringes. Then gauge blocks 32 and 33 are removed to allow slide 20 to be positioned against reference surface 25 to move focusing lens 19 by a distance equal to the desired radius of curvature of surface 31 to bring the focal point of test beam 18 to the region of the center of curvature of surface 31 as illustrated in FIG. 5. Test beam 18 is then reflected from surface 31 as a return beam interfering with the reference beam of interferometer 10 to produce round fringes showing any deviation of surface 31 from its desired radius of curvature. Such round fringes are counted directly to determine whether surface 31 meets the desired radius tolerance. Then mount 16 is adjusted to minimize the round fringes for observing the regularity of surface 31 to determine whether it meets the required tolerance.

Some of the general characteristics of interferometer 10 that are preferred for practicing the invention are that the source be a laser, and if its beam includes more than a single wave length, that the mount 16 for the test surface be arranged along the test arm at a region of maximum coherence function of the light beam for best observable interference. Such maximum coherence function regions occur at multiples of the laser length along the test arm of the instrument. Also, focusing lens system 19 preferably forms a spherical wave front which is most useful in testing optical surfaces.

Many related operations can be performed with the inventive interferometer. For example, for measuring a surface having a focal length greater than the travel distance of slide 20, a combination of motions of slide 20 and focusing lens 19 can be used, and the motion of focusing lens 19 relative to slide 20 can be measured with gauge blocks removably interposable between plate 24 and lens system 19. Verniers and other measuring devices can be used in lieu of gauge blocks for positioning slide 20 accurately along the test arm. Mirrors and lenses can be used to diverge or converge the test beam as desired for testing large diameter surfaces, and the instrument can also be used for measuring lenses by transmitting the test beam thorough a test lens.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will recognize ways that the inventive structure and method can be adapted to many circumstances, and will appreciate that many available methods and structures in the interferometry arts can be used in practicing the invention.

I claim:

1. An interferometer for measuring a test surface, said interferometer comprising:
   a. a mount for supporting said test surface in the test arm of said interferometer;
   b. a focusing lens system in said test arm of said interferometer;
   c. a slide carrying said focusing lens system;
   d. means for moving said slide a substantial distance along said test arm without moving said mount or the rest of said interferometer;
   e. means for adjusting the position of said focusing lens system throughout a substantial range along the length of said slide in the direction of said test arm; and
   f. means for positioning said slide quickly and accurately between two positions spaced apart along said test arm by the desired radius of curvature of said test surface, said focusing lens system in one of said positions being spaced from said test surface by the focal distance of said focusing lens system.

2. The interferometer of claim 1 wherein said positioning means comprises gauge blocks removably interposable between said slide and a fixed reference surface.

3. The interferometer of claim 2 including means for biasing said slide toward said reference surface.

4. The interferometer of claim 2 wherein said slide includes an abutment arranged so other gauge blocks are removably interposable between said abutment and said focusing lens system.

5. The interferometer of claim 1 wherein said test surface is arranged at a region of maximum coherence function of the light beam in said test arm.

6. The interferometer of claim 2 wherein said test surface is arranged at a region of maximum coherence function of the light beam in said test arm, and said focusing lens system produces a spherical wave front.

7. The interferometer of claim 6 wherein said slide is biased toward said reference surface and includes an abutment arranged so other gauge blocks are removably interposable between said abutment and said focusing lens system.

8. An optical surface-measuring method comprising:
   a. arranging a test surface to be measured in the test arm of an interferometer;
   b. adjusting the position of a movable focusing lens system along said test arm to focus test beam light at a point on said test surface;
   c. moving said focusing lens system along said test arm for a distance from said position equal to the desired radius of curvature of said test surface to move said test beam light focus to the region of the center of curvature of said test surface; and d. observing interference fringes between light returning from said test surface and a plane wave front reference beam to determine the deviation of the actual radius of curvature of said test surface from said desired radius of curvature.

9. The method of claim 8 including using gauge blocks equal to said desired radius of curvature for setting said distance of motion of said focusing lens system.

10. The method of claim 9 including removably interposing said gauge blocks between a fixed reference surface and a slide carrying said focusing lens system.

11. The method of claim 10 wherein said focusing adjustment includes positioning said focusing lens system along said slide line.

12. The method of claim 8 including adjusting said test surface after said movement of said focusing lens system to minimize said interference fringes to reveal unevenness of said test surface.

13. The method of claim 8 including arranging said test surface at a region of maximum coherence function of said test beam.

14. The method of claim 8 wherein said focusing adjustment includes coarse adjustment by positioning said focusing lens system on a slide movable along said test arm, and fine adjustment by positioning said test surface.

15. The method of claim 14 including positioning said test surface to produce linear fringes used to make said fine focusing adjustment.

16. The method of claim 8 including arranging said test surface at a region of maximum coherence function of said test beam and using gauge blocks equal to said desired radius of curvature for setting said distance of motion of said focusing lens system.

17. The method of claim 16 including removably interposing said gauge blocks between a fixed reference surface and a slide carrying said focusing lens system, and wherein said focusing adjustment includes positioning said focusing lens system along said slide.

18. The method of claim 17 including refining said focusing adjustment by positioning said test surface to produce linear fringes, and arranging said test surface so said observed fringes are round after said motion of said test beam focus to the region of the center of curvature of said test surface.

19. The method of claim 18 including counting said round fringes to measure the actual radius of curvature of said test surface, and then adjusting said test surface to minimize said round fringes to reveal any unevenness of said test surface.

* * * * *